United States Patent
Chan et al.

(10) Patent No.: US 8,471,501 B2
(45) Date of Patent: Jun. 25, 2013

(54) ILLUMINATION BRIGHTNESS CONTROL APPARATUS AND METHOD

(75) Inventors: Wing Chi Stephen Chan, Hong Kong (CN); Hing Mo Jeff Lam, Hong Kong (CN); Jun Pan, Shenzhen (CN); Stephen Wai-Yan Lai, Hong Kong (CN); Xiaolong He, Shenzhen (CN); Wai Kin Josh Cheng, Hong Kong (CN)

(73) Assignee: Solomon Systech Limited, Shatin, New Territories (HK)

( * ) Notice: Subject to any disclaimer, the term of this patent is extended or adjusted under 35 U.S.C. 154(b) by 218 days.

(21) Appl. No.: 13/032,486

(22) Filed: Feb. 22, 2011

(65) Prior Publication Data

US 2012/0212145 A1    Aug. 23, 2012

(51) Int. Cl.
*H05B 37/02* (2006.01)

(52) U.S. Cl.
USPC .................. 315/308; 315/200 R; 315/297

(58) Field of Classification Search
USPC ............. 315/185 R, 247, 291, 294, 297, 307, 315/308, 200 R
See application file for complete search history.

(56) References Cited

U.S. PATENT DOCUMENTS

| | | | |
|---|---|---|---|
| 3,329,838 A | 7/1967 | Myers | |
| 4,109,194 A | 8/1978 | Miller | |
| 4,360,743 A | 11/1982 | Stokes | |
| 5,504,398 A | 4/1996 | Rothenbuhler | |
| 6,586,890 B2 | 7/2003 | Min et al. | |
| 7,038,399 B2 | 5/2006 | Lys et al. | |
| 7,215,086 B2 | 5/2007 | Maxik | |
| 7,321,203 B2 | 1/2008 | Marosek | |
| 7,352,138 B2 | 4/2008 | Lys et al. | |
| 7,557,521 B2 | 7/2009 | Lys | |
| 7,642,734 B2 | 1/2010 | De Anna | |
| 7,750,579 B2 | 7/2010 | Aiello | |
| 7,759,881 B1 | 7/2010 | Melanson | |
| 7,791,326 B2 | 9/2010 | Dahlman et al. | |
| 2007/0182338 A1 | 8/2007 | Shteynberg et al. | |
| 2007/0182347 A1 | 8/2007 | Shteynberg et al. | |
| 2008/0136350 A1 | 6/2008 | Tripathi et al. | |
| 2008/0150450 A1 | 6/2008 | Starr et al. | |
| 2009/0261748 A1 | 10/2009 | McKinney et al. | |
| 2009/0302781 A1* | 12/2009 | Peker et al. ................... | 315/297 |
| 2009/0322247 A1 | 12/2009 | Goo et al. | |
| 2010/0079074 A1 | 4/2010 | Godbole | |
| 2010/0134038 A1 | 6/2010 | Shackle et al. | |
| 2010/0164394 A1 | 7/2010 | Liu | |

(Continued)

FOREIGN PATENT DOCUMENTS

EP    2 001 132 A1    12/2008

*Primary Examiner* — Tung X Le

(74) *Attorney, Agent, or Firm* — Finnegan, Henderson, Farabow, Garrett & Dunner, LLP

(57) ABSTRACT

An illumination brightness control apparatus receives an input voltage from a light dimmer and produces a control signal to regulate a drive signal to a power conversion switch of a switching mode power converter. The apparatus includes a voltage conditioning circuit to condition the dimmer input voltage to provide a conditioned voltage signal; an ADC circuit to sample analog data of the conditioned voltage signal at a sampling rate that is high relative to a nominal variation rate of the dimmer input voltage and to provide digital data corresponding to the sampled analog data; a digital signal processing circuit to produce a running data average of the digital data; and a controller to produce a signal corresponding to the running data average as the control signal to regulate the drive signal.

22 Claims, 12 Drawing Sheets

U.S. PATENT DOCUMENTS

| | | |
|---|---|---|
| 2010/0219764 A1 | 9/2010 | Yamasaki et al. |
| 2010/0259183 A1 | 10/2010 | Leshniak |
| 2011/0012521 A1* | 1/2011 | Byun et al. ............ 315/186 |
| 2011/0291587 A1* | 12/2011 | Melanson et al. ....... 315/291 |
| 2011/0309758 A1* | 12/2011 | Yu et al. ............... 315/192 |
| 2012/0038292 A1* | 2/2012 | Kuo et al. ............. 315/297 |
| 2012/0112665 A1* | 5/2012 | Melanson et al. ....... 315/294 |
| 2012/0181950 A1* | 7/2012 | Yu et al. ............... 315/294 |
| 2012/0229046 A1* | 9/2012 | Melanson ............. 315/247 |
| 2012/0274227 A1* | 11/2012 | Zheng et al. .......... 315/210 |

* cited by examiner

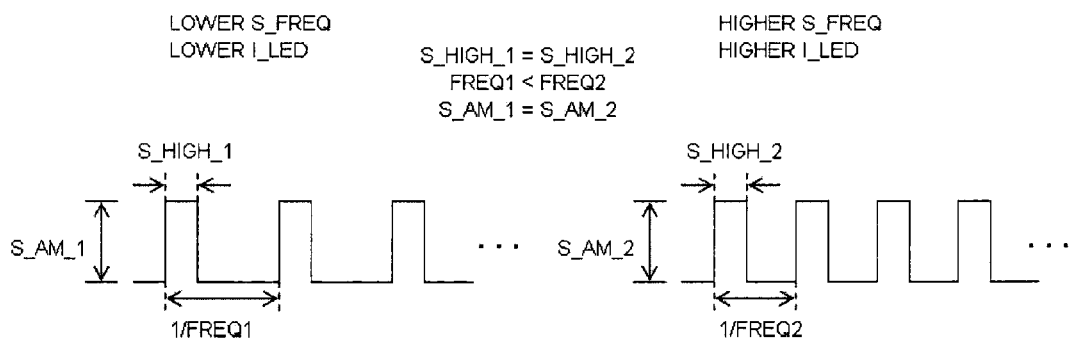
FIG. 6a SWITCH DRIVING SIGNAL WITH VARIABLE FREQUENCY
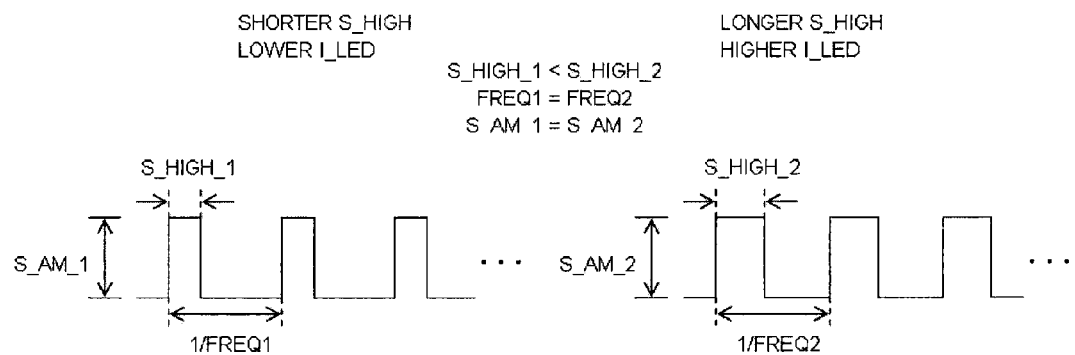
FIG. 6b SWITCH DRIVING SIGNAL WITH VARIABLE HIGH DURATION

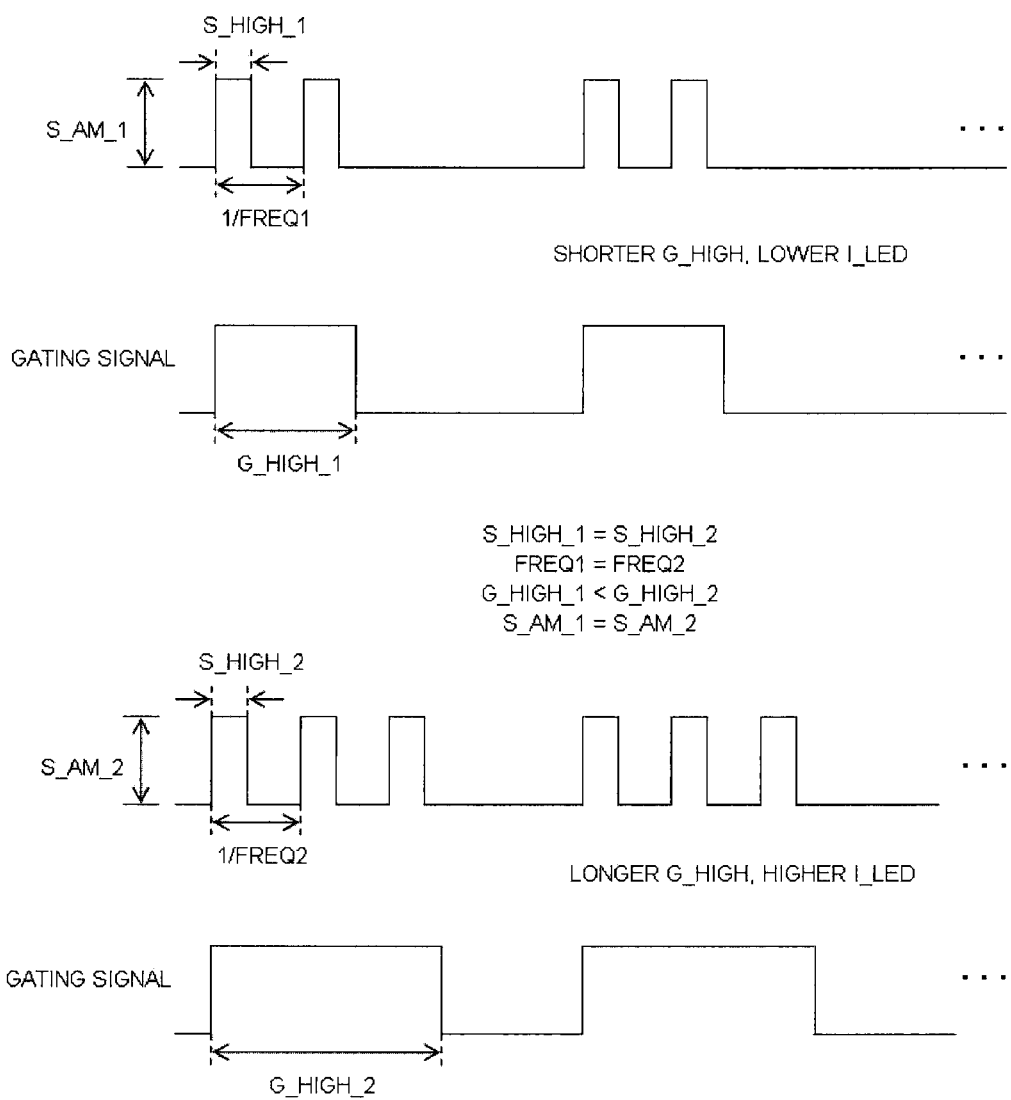
FIG. 6c SWITCH DRIVING SIGNAL WITH VARIABLE GATING

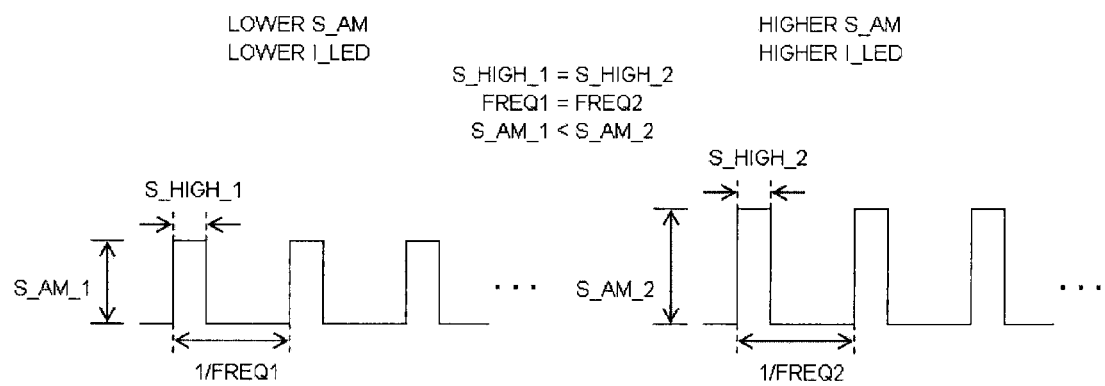
FIG. 6d SWITCH DRIVING SIGNAL WITH VARIABLE AMPLITUDE

ILLUMINATION BRIGHTNESS CONTROL APPARATUS AND METHOD

TECHNICAL FIELD

The apparatus and method disclosed herein relate to the field of controller design for light emitting diode (LED) lighting applications.

BACKGROUND

Silicon-controlled-rectifier (SCR) type dimmers are commonly used for conventional incandescent tungsten filament-type light bulbs. An exemplary SCR dimmer circuit topology is shown in FIG. 1. The circuit of FIG. 1 operates from an alternating current (AC) line input to drive a lighting load ("LOAD"), and includes a diac and a triac (diac and triac are different types of SCR-type devices, also known as thyristors in general), a variable timing resistor R1, a fixed value resistor R2 for minimum value setting, and a timing capacitor C1.

FIGS. 2(a)-2(c) illustrate ideal input and output waveforms of the SCR dimmer circuit of FIG. 1 for an intermediate dimming level set by timing resistor R1. FIG. 2(a) represents the AC line input waveform, FIG. 2(b) represents a leading edge phase cut output waveform, and FIG. 2(c) represents a trailing edge phase cut output waveform. The SCR AC output is directly used to drive the lighting load, which may be a tungsten filament light bulb. Light is produced when the filament is heated by electrical power to glow white-hot. In FIGS. 2(b) and 2(c), θ indicates the on-time of the SCR. A longer on-time generally corresponds to higher electrical power used to heat the filament and brighter illumination. Adjusting the variable timing resistor R1 changes the duration of the on-time as well as the brightness level. The delay duration ("Delay") in FIGS. 2(b) and 2(c) indicates the SCR off-time during which no electrical power is provided to heat the filament. However, because the on and off cycle time is fast—at double the line frequency—and because fluctuation of the filament temperature is relatively slow due to its slow thermal response, the filament will stabilize at an average temperature that is dependent on the average power determined by the duration of the on-time set by the timing resistor. As a result, the illumination brightness level of the tungsten filament light bulb is steady with no discernable flickering, even though the SCR is switching the power on and off. The SCR dimmer has become the standard apparatus for illumination brightness control in conventional AC incandescent lighting applications.

Due to their favorable energy-saving and environmental considerations, high brightness LEDs are emerging as desirable future lighting devices compared to conventional tungsten filament and fluorescent lights, at least in part due to their energy efficiency. Accordingly, there has been a growing interest in replacing conventional lights with LEDs and in operating LED lighting appliances directly from conventional AC power sources and conventional SCR dimmers.

A tungsten filament produces light emission through its resistive AC conducting nature. An LED, on the other hand, requires forward bias for direct current (DC) conduction to produce light emission, due to its diode nature. Also, unlike the slow thermal response of a resistive tungsten filament, the response time of an LED is less than a microsecond, i.e., nearly instantaneous when compared to the standard AC line frequencies of 50~60 hertz. As a result, the illumination brightness of an LED will basically follow any intentional or un-intentional fluctuations in the LED drive current.

In order to operate LED lighting appliances from conventional AC power lines and SCR type dimmers, a DC drive circuit may be provided to drive the LEDs using the AC power output from an SCR dimmer. Because slow brightness variations at AC line rates of 50~60 hertz may be perceived by the human visual system, variations in the drive current at rates below around double the line rates, i.e., below 100~120 hertz, should be eliminated in order to ensure flicker-free illumination brightness. For brightness variation rates that fall well above AC line rate, the human visual system will average out brightness variations and perceive a steady brightness as long as a steady averaged DC drive current is provided to the LED.

FIG. 3 shows an exemplary switching mode power converter apparatus 300, configured as an AC-to-DC (AC/DC) lighting controller driver for driving an LED from a conventional SCR dimmer output. Switching mode power converter apparatus 300 includes a rectifier circuit 301 for receiving and rectifying the SCR AC dimmer output, and a dimmer loading circuit 302 for providing an appropriate load to ensure proper operation of the SCR. Inclusion of dimmer loading circuit 302 may be desirable because the SCR may require a minimum current for starting and maintaining conduction. Switching mode power converter apparatus 300 also includes a power factor correction (PFC) and electromagnetic interference (EMI) filter circuit 303 to compensate for power factor degradation and to reduce EMI resulting from switching mode power converter operation. Switching mode power converter apparatus 300 further includes a power conversion controller 304 for controlling switching mode power conversion operation, a switching mode power conversion inductor 306, a power switch 307, a current sensing resistor 308, and a power storage capacitor 309. The value of current sensing resistor 308 may be determined according to a desired current sense voltage (VCS) and peak inductor current. Switching mode power converter apparatus 300 is configured to provide power to an LED circuit 305 for illumination. LED circuit 305, switching mode power conversion inductor 306, power switch 307, current sensing resistor 308, and power storage capacitor 309 together constitute an LED device module 310.

Switching mode power converter apparatus 300 functions by switching power switch 307 at frequencies much higher than the line frequency, typically in the range of kilohertz to hundreds of kilohertz, or even megahertz. By appropriately selecting values for inductor 306, capacitor 309, and sensing resistor 308, power conversion controller 304 can provide a switch driving signal (SWITCH_DRIVE) to operate power switch 307 at an appropriately high switching frequency while producing the desired current sense voltage (VCS) to produce a steady average drive current in LED circuit 305. A steady illumination brightness level may be achieved with such a steady average drive current in LED circuit 305, provided that a low variation rate (below around 100 hertz of drive current), which may be visible to the naked eye, is not present.

Although there may be variations in the configuration of the switching mode power converter type lighting controller driver illustrated in FIG. 3, the average drive current in the LED circuit, and consequently the LED illumination brightness level, is generally controlled by tuning the switch driving signal (SWITCH_DRIVE) applied to a gate of power switch 307. Thus, driving and controlling the LED lighting illumination brightness using a light dimmer is performed by generating a control signal dependent on the dimmer output and using that control signal to control switch driving signal SWITCH_DRIVE.

One conventional approach to controlling illumination brightness of an LED circuit is to filter the rectified input voltage from the dimmer to obtain a voltage signal that corresponds to the dimmer input power, and use the voltage signal as a control signal to control the drive signal SWITCH_DRIVE. However, a first problem with this approach is that it requires a relatively large value filter capacitor that may be difficult to integrate onto an integrated circuit. A second problem with this approach is that because the dimmer input is an AC voltage signal, some fluctuations will remain in the voltage signal even when the dimmer is set at a constant setting. Using a line rate fluctuating voltage signal as the control signal may lead to fluctuations in the illumination brightness at line rates to which the human visual system is sensitive. A third problem with this approach is that accurate sensing of the voltage signal over a large voltage range and the accurate control of the drive signal SWITCH_DRIVE using analog circuits in a noisy switching mode power converter system may be difficult.

Another conventional approach is to sense the durations (also referred to as phase angle or duty cycle) of AC waveforms of the input voltage from the dimmer and use the waveform width duration values to provide the control signal. FIGS. 4(a)-4(e) show the voltage waveforms of the outputs of several commercial dimmers. As FIGS. 4(a)-4(e) show, there are large differences among output waveforms of different dimmers in addition to instabilities and irregularities within each output waveform. Because there is no reliable way to determine the amplitudes of these irregularly shaped "pulses," measuring the pulse widths of these different waveforms is difficult, yielding unreliable and inconsistent results. Cases with multiple "pulses" or "ringings" within one AC cycle further complicate the pulse width measurement. Therefore, in the general lighting application market where many different kinds of commercial dimmers are used, such inconsistent pulse width data prevents production of a consistent control signal in LED lighting control to provide reliable and steady illumination brightness control.

SUMMARY

Consistent with the present disclosure, there is provided an illumination brightness control apparatus for receiving an input voltage from a light dimmer to produce a control signal to regulate a drive signal to a power conversion switch of a switching mode power converter. The illumination control apparatus includes a voltage conditioning circuit to condition the dimmer input voltage to provide a conditioned voltage signal; an ADC circuit, coupled to receive the conditioned voltage, to sample analog data of the conditioned voltage signal at a sampling rate that is high relative to a nominal variation rate of the dimmer input voltage and to provide digital data corresponding to the sampled analog data; a digital signal processing circuit, coupled to receive the digital data provided by the ADC circuit, to produce a running data average of the digital data; and a controller, coupled to receive the running data average, to produce a signal corresponding to the running data average as the control signal to regulate the drive signal.

Consistent with the present disclosure, there is also provided a lighting appliance. The lighting appliance comprises an illumination brightness control apparatus for receiving an input voltage from a light dimmer to produce a control signal to regulate a drive signal to a power conversion switch of a switching mode power converter. The apparatus includes a voltage conditioning circuit to condition the dimmer input voltage to provide a conditioned voltage signal; an ADC circuit, coupled to receive the conditioned voltage sample analog data of the conditioned voltage signal at a sampling rate that is high relative to a nominal variation rate of the dimmer input voltage and to provide digital data corresponding to the sampled analog data; a digital signal processing circuit, coupled to receive the digital data provided by the ADC circuit, to produce a running data average of the digital data; and a controller, coupled to receive the running data average, to produce a signal corresponding to the running data average as the control signal to regulate the drive signal, and an LED coupled for driving by the switching mode power converter.

Consistent with the present disclosure, there is also provided an illumination brightness control method for receiving an input voltage from a light dimmer and producing a control signal to regulate the drive signal to a power conversion switch of a switching mode power converter. The illumination control method includes conditioning the input voltage of the dimmer to provide a conditioned voltage signal; performing analog-to-digital conversion of the conditioned voltage signal at a sampling rate that is high relative to a nominal variation rate of the dimmer input voltage to provide digital data corresponding to the sampled analog data; producing a running data average from the digital data; and producing a control signal corresponding to the running data average as the control signal to regulate the drive signal.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate various embodiments. In the drawings:

FIGS. 6(a)-6(d) show waveforms of a switch drive signal for four exemplary modes of operations.

DESCRIPTION OF THE EMBODIMENTS

Apparatus and method disclosed herein are directed to application of common SCR type dimmers for conventional lighting to illumination brightness control of LEDs. The disclosed apparatus and method accommodate brand-to-brand variations, irregularities and instabilities in SCR dimmer output voltages, and achieves substantially flicker-free illumination brightness control over wide ranges.

More particularly, apparatus and method disclosed herein provide an improvement in deriving a control signal from a dimmer output to control illumination brightness control parameters of an AC/DC switching mode power converter in a lighting controller driver to drive LEDs from a conventional SCR dimmer. The apparatus and method disclosed herein provide a steady average LED current and substantially flicker-free illumination, including for low brightness and low dimmer loading current, while delivering power efficiently. By incorporating the improved illumination brightness control apparatus into LED lighting apparatus, problems associated with illumination brightness control using conventional dimmers can be avoided when LED lighting apparatus is substituted for existing conventional lighting apparatus.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of systems and methods consistent with aspects related to the invention as recited in the appended claims. Those skilled in the art will further appreciate that the embodiments can also be practiced in other systems or methods or can be modified depending on system design or applicants.

Figure 5:
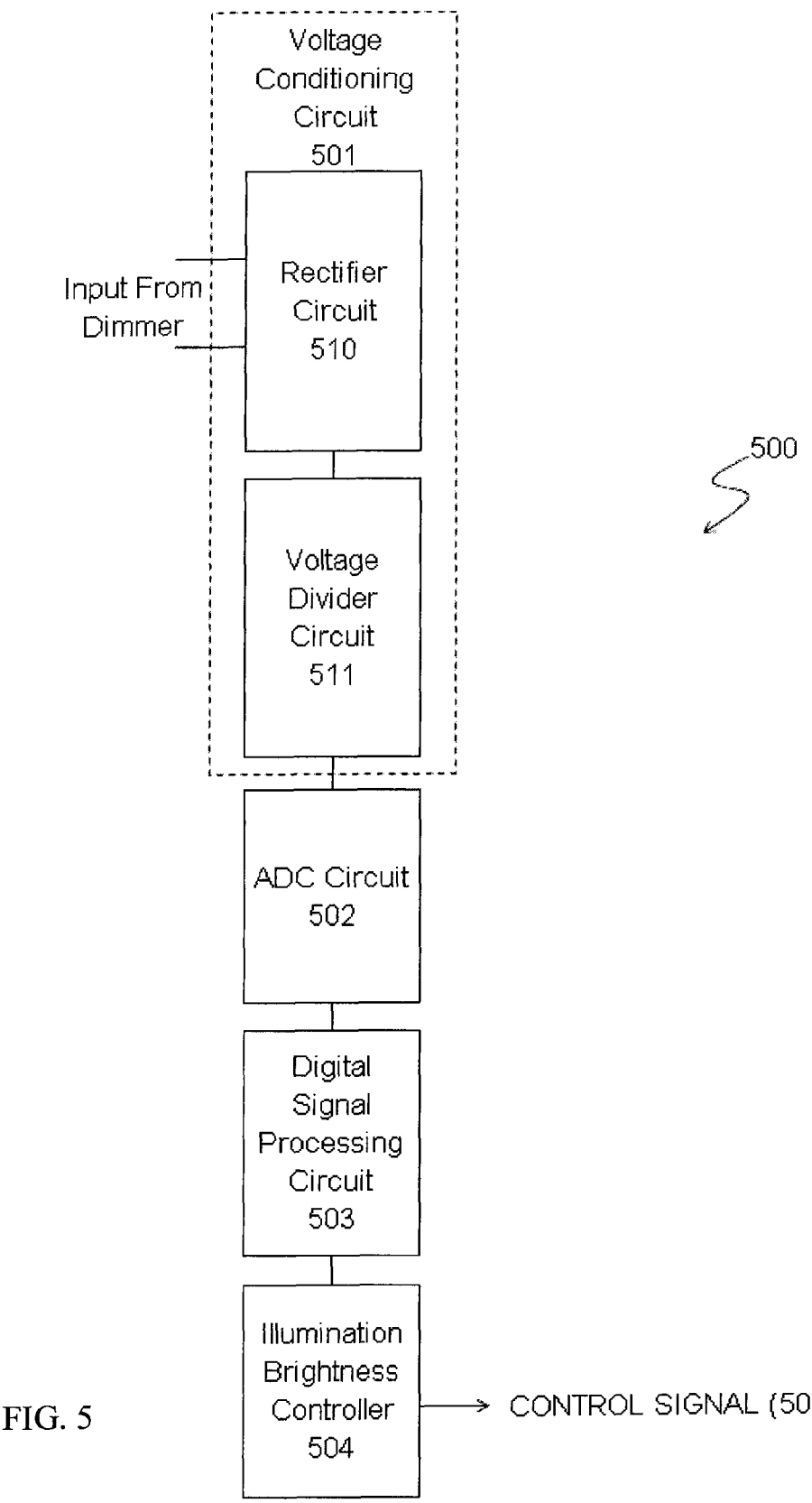
FIG. 5 is a block diagram of an illumination brightness control apparatus in accordance with an exemplary embodiment.

FIG. 5 is a block diagram of an illumination brightness control apparatus 500, consistent with an embodiment of the present disclosure. Illumination brightness control apparatus 500 receives an AC input from a light dimmer to produce a control signal that regulates a drive signal to a power conversion switch of a switching mode power converter for an LED controller driver and thereby controls average LED drive current and consequent LED illumination brightness level. Apparatus 500 may be provided as an assembly of discrete components, as an integrated circuit, or as part of an overall integrated illumination brightness control and switching power conversion control and driver circuit. In one embodiment, one or more parts, for example a rectifier circuit, may be deemed not suitable for integration for a given wafer technology being used to fabricate the integrated circuit. Alternatively, a simple rectifier circuit, such as a low power diode, for providing a representative dimmer signal may be integrated depending on the wafer technology. As used herein, the term "integrated circuit" is intended to mean a circuit of components constructed on a single semiconductor wafer or chip, in which the components are interconnected to perform a function.

Figure 1:
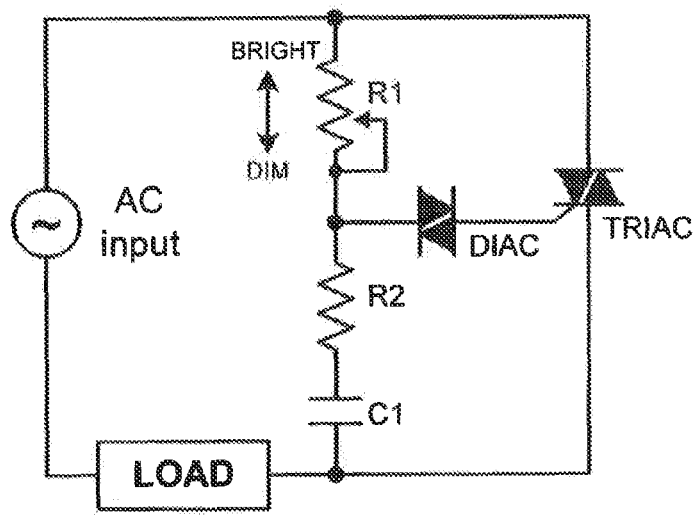
FIG. 1 shows a circuit topology of a conventional SCR dimmer.
Figure 2:
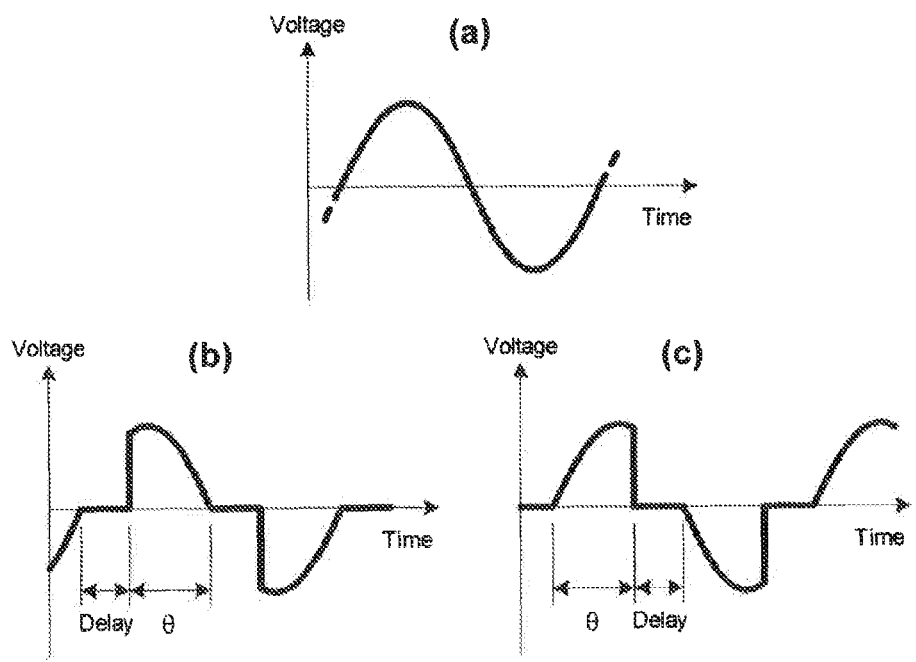
FIG. 2(a) shows an input waveform of an AC line input to an SCR dimmer.
FIG. 2(b) shows a leading edge phase cut output waveform of an SCR dimmer.
FIG. 2(c) shows a trailing edge phase cut output waveform of an SCR dimmer.
Figure 3:
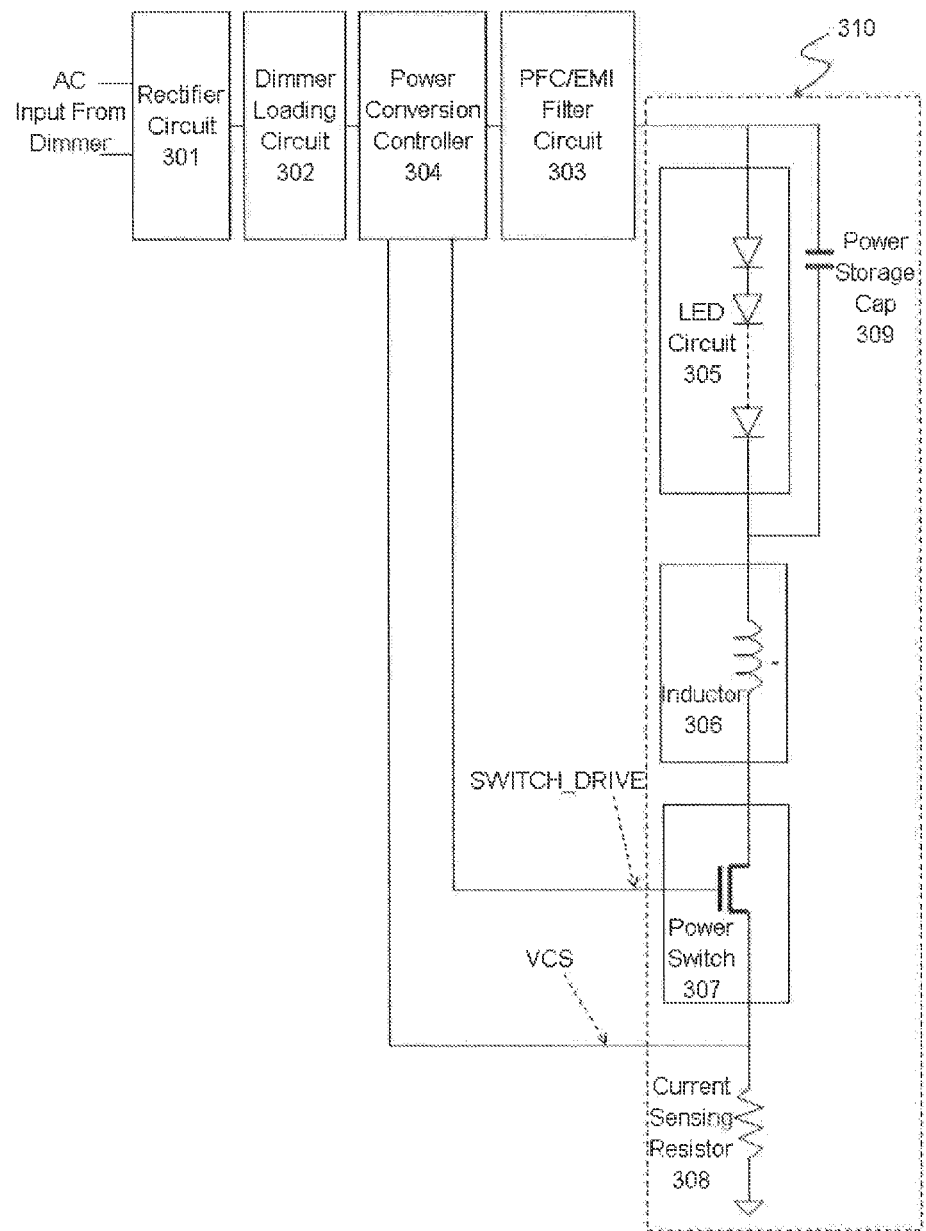
FIG. 3 shows an exemplary configuration of a conventional switching mode power converter apparatus.
Figure 4A:
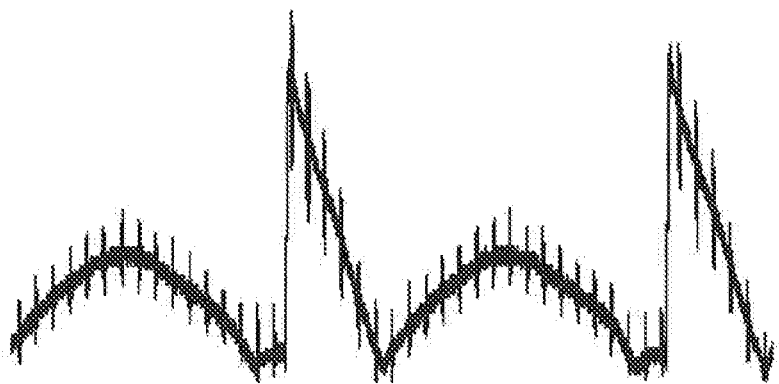
FIGS. 4(a)-4(e) show output voltage waveforms of different commercial dimmers.
Figure 4B:
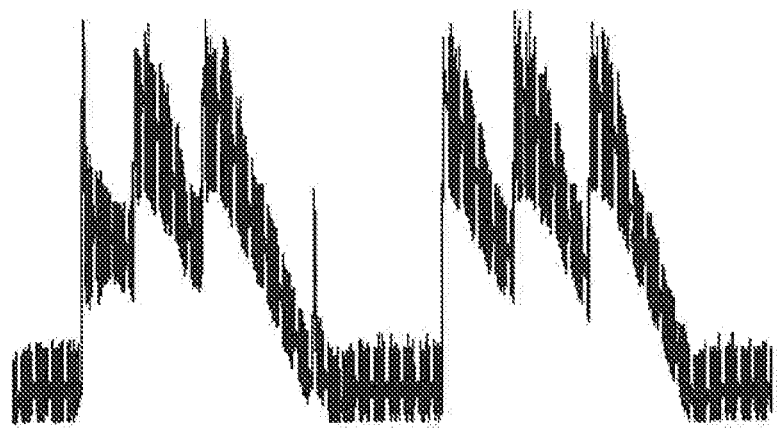
Figure 4C:
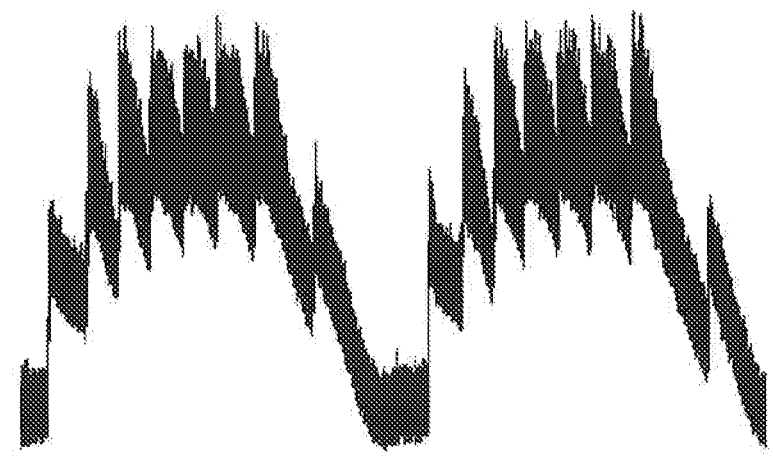
Figure 4D:
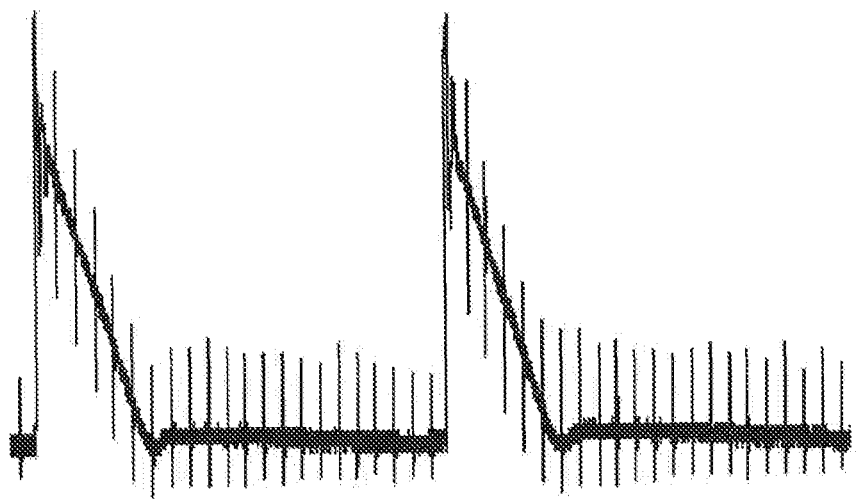
Figure 4E:
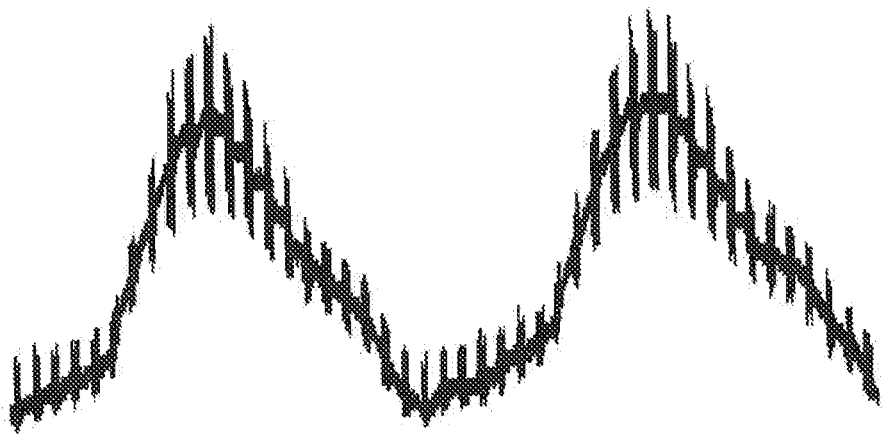

With reference to FIG. 5, illumination brightness control apparatus 500 includes a voltage conditioning circuit 501 to convert the input from a light dimmer to a suitable conditioned signal for provision to an analog-to-digital converter (ADC) circuit 502. Voltage conditioning circuit 501 includes an optional rectifier circuit 510 to convert the AC input signal from the light dimmer to a DC signal. In one embodiment, rectifier circuit 510 can be provided as any single phase rectifier suitable for rectifying an AC voltage waveform of the type shown in FIGS. 2(a)-2(c). For example and without limitation, rectifier circuit 510 may be configured similar to rectifiers provided in conventional switching mode power converter apparatus. Alternatively, as previously mentioned, rectifier circuit 510 may be provided as a low power diode. Because the voltage level of the input from the light dimmer may be too high for ADC 502, a voltage divider circuit 511 may be included to reduce the input voltage to an appropriate level for ADC 502.

In order to obtain data to estimate power received from the dimmer input, ADC 502 samples at a relatively high rate the conditioned dimmer input received from voltage conditioning circuit 501. As shown by the fluctuating waveforms exemplified in FIGS. 4(a)-4(e), an exemplary sampling rate may be over 10 times the nominal or fundamental variation rate, i.e., the AC line rate of 50~60 hertz, when the dimmer is operating from the AC line. A relatively high sampling rate of this order produces greater accuracy at relatively small expense. Consistent with one embodiment, the input from the dimmer is not filtered or averaged, and remains a continuously varying analog input signal.

The sampled data output from ADC 502 is passed to a digital signal processing circuit 503. As the highly fluctuating dimmer output waveforms exemplified in FIGS. 4(a)-4(e) show, it may be impractical to obtain an average voltage on an AC line cycle or even multiple cycle basis. Similarly, it may be impractical to obtain the waveform pulse widths from the dimmer signal.

Accordingly, in accordance with one embodiment, digital signal processing circuit 503 is configured to perform digital signal processing on the sampled data from ADC 502 to obtain a running data average that corresponds to the average power input from the dimmer to voltage conditioning circuit 501. A running data average is employed so that a stable average may be obtained when the dimmer is tuned to a stable setting, even at low loading currents, regardless of any instantaneous irregularities in the waveform and regardless of differences in waveforms of different brands of dimmers. For example and without limitation, the running data average may be obtained through a sum of running sampled data, weighted by a normalizing factor, over a number of sampled data. Digital signal processing circuit 503 may a specialized microprocessor with architecture adapted for performing digital signal processing.

Consistent with one embodiment disclosed herein, the sampled data and the digital signal processing performed do not involve determining the phase angle or duty cycle of the input from the dimmer. As shown in FIGS. 4(a)-4(e), the output waveforms of different brands of commercial dimmers in the marketplace can vary greatly and do not have well-defined phase angles or duty cycles, especially when operating at low load current conditions. In addition, to improve overall efficiency, the load current for the dimmer may be minimized, which may be facilitated by use of the running data average. The running data average may be used to mitigate the effects of large fluctuations in the dimmer output waveforms when the dimmer may become increasingly unstable at low current levels.

In one embodiment, in order to obtain a steady average value of the voltage input from the dimmer, even in the presence of irregular random data noise spikes, the time duration for averaging the running data may be relatively long when compared to the nominal or fundamental variation rate in the running data. However, averaging time duration as long as a second may manifest as sluggishness in dimming control when operating the dimmer. For example and without limitation, a running data average for N number of sampled data may be obtained by adding new incoming data to weighted last running data average and then re-taking the average. This determination of running data average can be represented as:

AVERAGE=((N−1)×LAST_AVERAGE+NEW_DATA)/N. By time sampling the time varying input data, the number N of sampled data used in taking the running data average is equivalent to the time duration used for taking the average.

The running data average corresponding to the average power input from the dimmer is provided to an illumination brightness controller 504. Consistent with one embodiment, controller 504 is configured to produce a control signal 505 suitable for use by a power conversion controller, such as controller 304, to control illumination brightness control parameters, which are described more fully below. In this embodiment, the functional value of control signal 505 produced by controller 504 corresponds to the running data average and consequently corresponds to the average input power from the dimmer, which is not necessarily linear. Controller 504 may be the overall controller in the illumination brightness control apparatus 500, which integrates, coordinates, and controls the voltage conditioning circuit 501, the ADC 502, and the digital signal processing circuit 503.

Control signal 505 produced by controller 504 can be applied to a power conversion controller, such as controller 304, to tune the generated switch driving signal (SWITCH_DRIVE) to control power switch 307 to provide an average drive current in the LED circuit, and consequently an LED illumination brightness level, consistent with the input from the dimmer. The tuning may be performed by controlling, alone or in combination, switch driving signal frequency, switch driving signal duty cycle, gating of the switch driving signal, or switch driving signal amplitude. FIGS. 6(a)-6(d) show waveforms for these four SWITCH_DRIVE control modes. FIG. 6(a) shows the switch driving signal with a variable switch signal frequency (S_FREQ) and a fixed switch signal high duration (S_HIGH); FIG. 6(b) shows the switch driving signal with a fixed switch signal frequency (S_FREQ) and a variable switch signal high duration (S_HIGH); FIG. 6(c) shows the switch driving signal with a fixed switch signal frequency, a fixed switch signal high duration, and a variable switch drive gating signal high duration (G_HIGH) at a given gating frequency; and FIG. 6(d) shows the switch driving signal with a fixed switch signal frequency, a fixed switch signal high duration, and a variable switch drive amplitude (S_AM).

Consistent with one embodiment disclosed herein, driving and controlling of the LED lighting illumination brightness using a light dimmer is performed by generating control signal 505 dependent on the running data average of the dimmer output and using control signal 505 to control one or several illumination brightness control parameters. These parameters include, but are not limited to, the switch driving signal frequency (S_FREQ), the switch driving signal high duration (S_HIGH), the switch drive gating signal high duration (G_HIGH), and the switch driving signal amplitude (S_AM). For example and without limitation, controller 504 may control the drive signal frequency S_FREQ by providing a control voltage for a voltage controlled oscillator or by selecting a resistor or capacitor value for an RC controlled oscillator. Controller 504 may control the drive signal high duration S_HIGH by controlling a voltage or a current that determines a circuit node charging and discharging times. Controller 504 may also control the switch drive gating signal high duration G_HIGH by a counter controlling switch drive activation. Controller 504 may further control the switch drive amplitude S_AM by selecting a level from a range of drive levels. These exemplary and other control schemes for the power switch by the power conversion controller, such as power conversion controller 304, may be configured in various ways to include various components for the control signal 505 from the illumination brightness controller 504.

Consistent with various embodiments, controller 504 may produce control signal 505 in the form of digital data, analog data, a modulation signal, or a gating signal, depending on a desired application. The form and value of control signal 505 are collectively referred to herein as the functional value of control signal 505. When in the form of digital or analog data, control signal 505 from controller 504 may be used as input to the power conversion controller, e.g., controller 304, to control certain illumination control parameters, including the switch frequency (S_FREQ) and/or the switch signal high duration (S_HIGH), that control illumination brightness. When in the form of a modulation signal, control signal 505 may be used to modulate one or more switch driving signal parameters, including switch frequency (S_FREQ), switch signal high duration (S_HIGH), switch driving signal amplitude (S_AM), and the switch driving signal phase relationship with certain operating signals (not shown) in the power conversion controller. When in the form of a gating signal, control signal 505 may control the gating high duration (G_HIGH). The exemplary modes of operation for some of these illumination control parameters are illustrated in FIGS. 6(a)-6(d).

In one embodiment, controller 504 updates the control signal 505 if at least one of a number of conditions or thresholds is met for the running data average. The conditions or thresholds may include, but are not limited to, a minimum change in value, a maximum change in value, a range of values, a minimum running period, a maximum running period, a periodic period, an indication of a stable value, and an indication of an unstable value. Control signal 505 may be updated by adjusting its functional value according to the conditions or thresholds. By using a conditional update of control signal 505, additional optional control features may be implemented. Exemplary optional control features include locking the control signal and thus the illumination brightness at a level until the running data average has undergone a pre-determined change in value, using a non-linear correlation or mapping between the running data average and the functional value of the control signal, and providing convenient means to perform non-linear control of the illumination brightness to match it with human visual brightness perception, which tends to be less sensitive at high brightness levels. Stability of the illumination brightness may be further improved when small fluctuations arising from, for example, nominal or transient line voltage variations and dimmer output irregularities, such as those arising from an insufficient load current for normal functioning of the SCR, are intentionally ignored. This may be achieved by configuring controller 504 to regulate updates to control signal 505. For example and without limitation, the exemplary control features discussed herein may be implemented by functions of digital signal processing circuit 503 and controller 504.

In an exemplary application consistent with the present disclosure, controller 504 updates control signal 505 with a predetermined functional value when the running data average cannot reach a stable range of values. The predetermined functional value of the control signal is intended to cause predetermined adjustments to one or more of the illumination control parameters (S_FREQ, S_HIGH, G_HIGH, S_AM), dimmer loading circuit 302, or other parameters in the switch mode power converter LED controller driver system. Regulating dimmer loading circuit 302 may be necessary for some commercial dimmers in order to maximize overall power efficiency. When the average LED driving current is low, an increase in dimmer loading may be required to keep the dimmer functioning properly. For example and without limitation, the dimmer loading circuit 302 may be configured to include a variable resistive load which varies in a linear or non-linear fashion in accordance with the functional value of the control signal 505.

Figure 7:
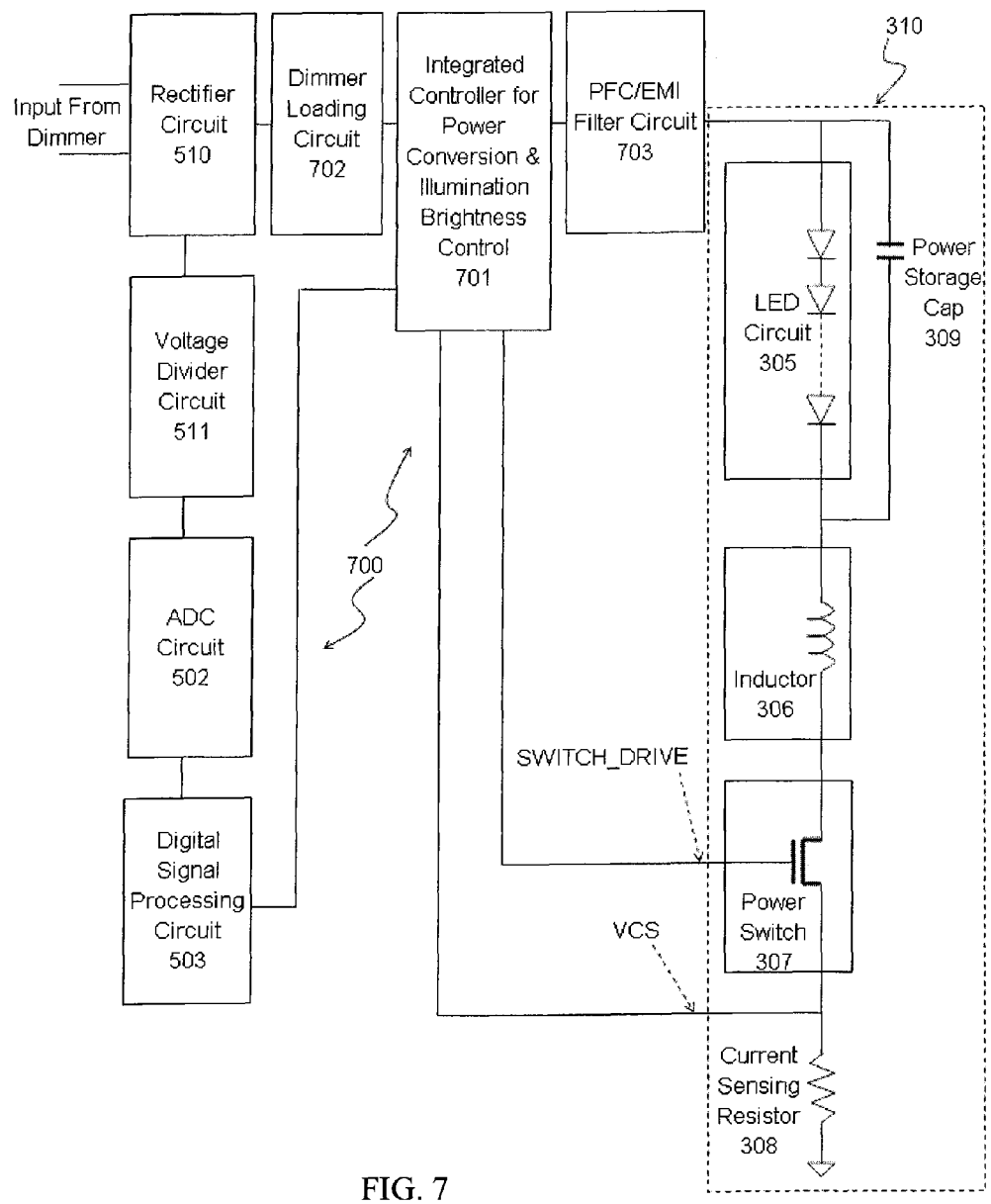
FIG. 7 is a block diagram of an integrated AC/DC LED controller driver integrated circuit with dimming control in accordance with an exemplary embodiment.

FIG. 7 is a block diagram of an integrated AC/DC LED controller driver integrated circuit 700 with dimming control, consistent with an embodiment of the present disclosure. Integrated AC/DC LED controller driver integrated circuit 700 may be formed by configuring one or more parts of an illumination brightness control apparatus, e.g., apparatus 500, with one or more parts of a switching mode power converter apparatus, including LED device module 310. FIG. 7 shows one exemplary configuration. In FIG. 7, rectifier circuit 510 is provided as a common rectifier and an integrated controller 701 is provided for power conversion and illumination brightness control. Consistent with one exemplary embodiment, integrated AC/DC LED controller driver integrated circuit 700 is configured as an integrated circuit including voltage divider circuit 511, ADC circuit 502, digital signal processing circuit 503, integrated controller 701, a dimmer loading circuit 702, a PFC and EMI filtering circuit 703, all of which are suitable for integration into an integrated circuit. Certain parts may not be suitable for integration, including rectifier circuit 510, inductor 306, power switch 307, current sensing resistor 308, power storage capacitor 309, parts of dimmer loading circuit 702 (such as line voltage transistors and zener diodes), parts of PFC and EMI filtering circuit 703 (such as power diodes, inductors, and capacitors). Such parts may be deemed unsuitable for integration depending on the wafer technology chosen for fabricating the integrated circuit. In one embodiment, these parts may constitute external components that are nevertheless needed for the overall LED lighting system. Fewer external components may be required when the integrated AC/DC LED controller driver integrated circuit 700 employs active PFC and low EMI switching techniques.

In one embodiment, integrated controller 701 is a circuit that integrates various digital control as well as mixed signal functions, combining the power conversion controller, such as the power conversion controller 304, and illumination brightness controller 503, into a single architecture. Integration of the controllers facilitates full and versatile control of the power switch by means of the illumination brightness control parameters in accordance with the running data average of the power from the dimmer, as described above in connection with illumination brightness control apparatus 500.

Figure 8:
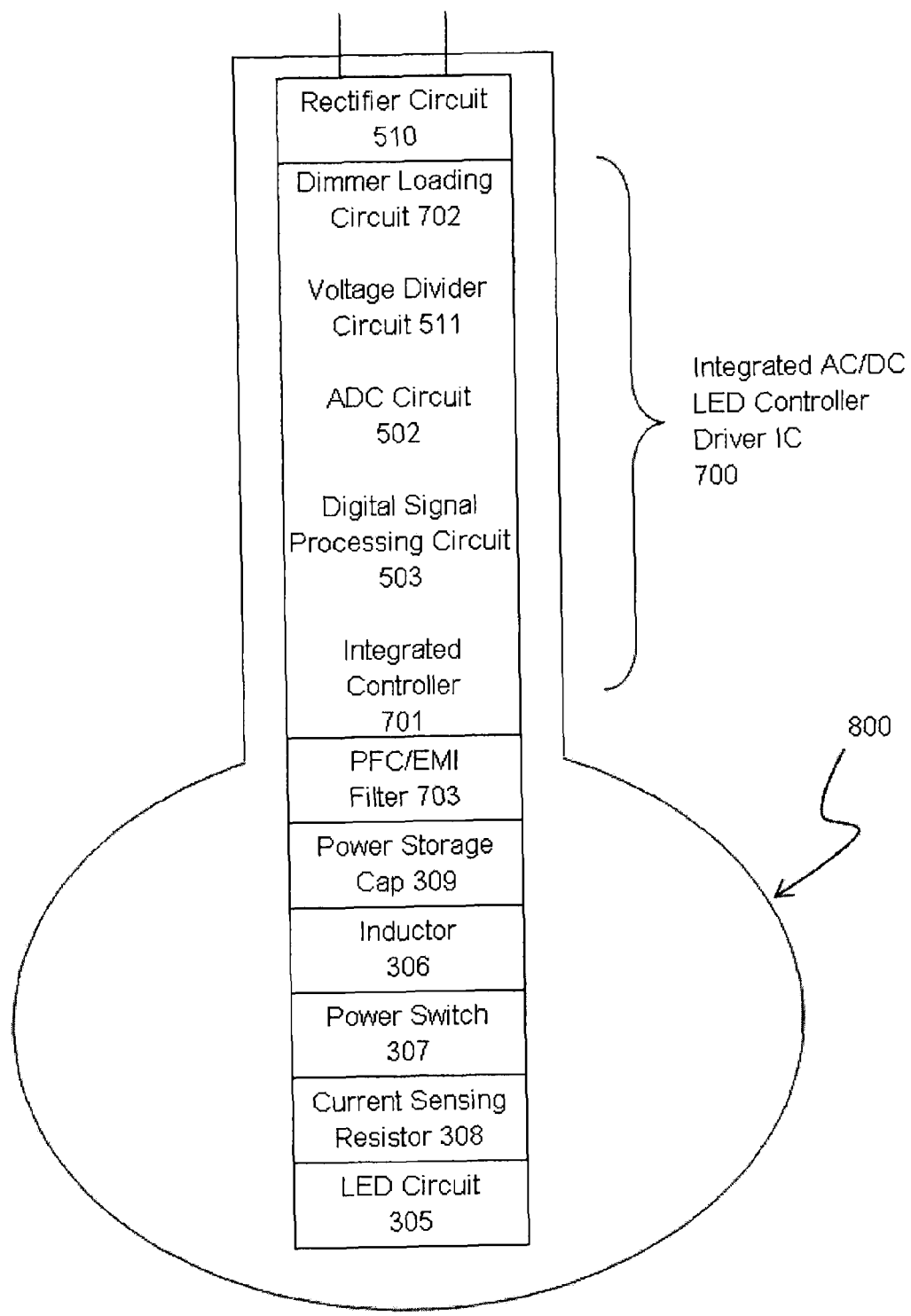
FIG. 8 is a block diagram illustrating the illumination brightness control apparatus embedded in a LED lighting appliance as a light bulb form factor, in accordance with an exemplary embodiment.

Upon integration of functions into a single integrated circuit and assembly with non-integrateable components such as noted above, LEDs and their associated AC/DC controller and driver components may be placed inside a conventional light bulb form factor to form an LED light bulb that may substitute for a conventional light bulb in a conventional lighting system. The illumination control apparatus disclosed herein enables an LED light bulb to produce steady light while being dimmed despite different brands of commercial dimmers that may be present in a conventional lighting system. The LED light bulb may represent a good exemplary application for the illumination brightness control apparatus and method disclosed herein due to its reliability and flexibility. Manufacturers and consumers may prefer an LED light bulb that functions equally well, regardless of its location or brand of light dimmer used, as is the case for conventional tungsten filament light bulbs. FIG. 8 is a block diagram illustrating an exemplary application of the disclosed illumination brightness control apparatus. As FIG. 8 shows, the disclosed illumination brightness control apparatus is embedded in a light bulb form factor as an LED lighting appliance 800. Other form factors, such as light tubes or light tracks, are also applicable.

According to one exemplary embodiment, integrated AC/DC LED controller driver integrated circuit 700 with dimming control may include programmable elements in digital signal processing circuit 503 and integrated controller 701 to provide applications customization for power conversion and illumination brightness control. These programmable elements may provide one or several programmable features, including and not limited to programmable sampling rate of the ADC, programmable period of the running data average period, programmable correlation (such as by varying digital filter coefficients) between the running data average and the average input power from the dimmer, programmable correspondence (such as by varying data decoding or data in look up tables) between functional values of control signal 605 and the running data average, and programmable updating rate of control signal 605. In one embodiment, these programmable elements may be implemented through, for example, nonvolatile memory elements or fuse elements programmed and coupled with digital signal processing circuit 503 and integrated controller 701 during manufacturing.

Figure 9:
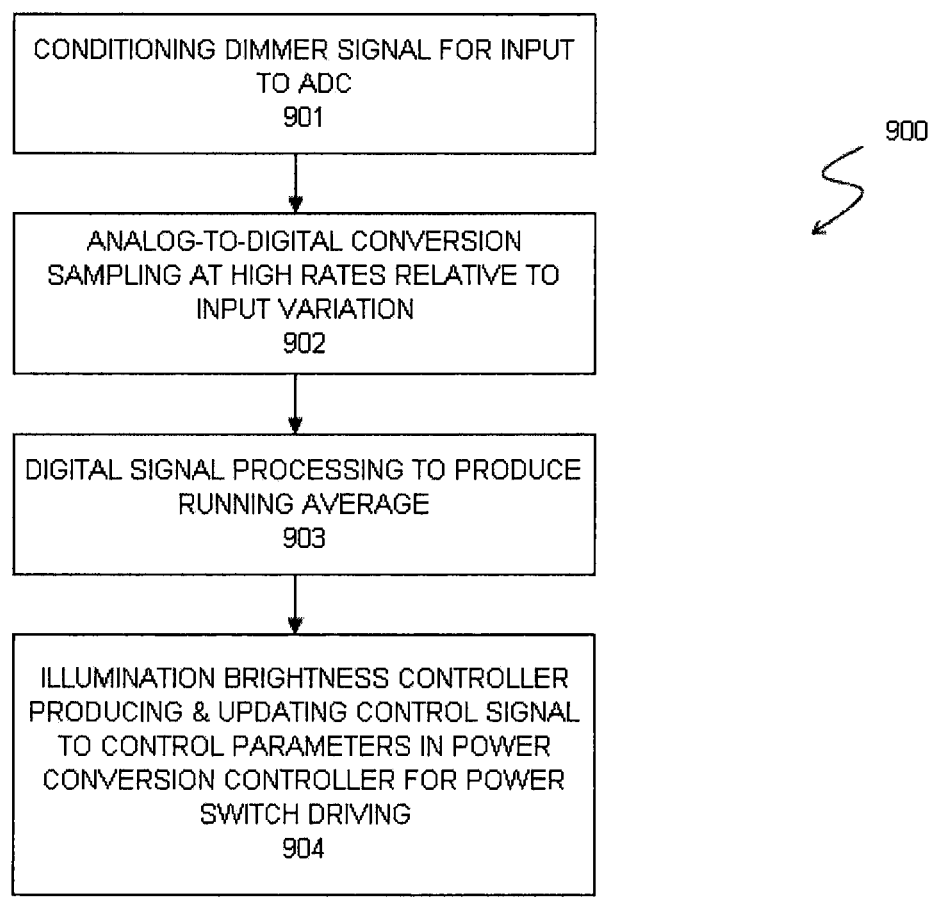
FIG. 9 is a flow chart of an illumination brightness control method in accordance with an exemplary embodiment.

FIG. 9 shows an exemplary embodiment of an illumination brightness control method 900 for controlling the illumination brightness level of an LED. Method 900 involves receiving an input from a light dimmer to produce a control signal that can regulate the drive signal to a power conversion switch of a switching mode power converter for an LED controller driver. The drive signal controls the average drive current to the LED, and the consequent LED illumination brightness level. As FIG. 9 shows, illumination control method 900 includes: conditioning the voltage of the input from the dimmer (901) to provide a corresponding low voltage dimmer signal suitable for analog-to-digital data conversion; performing analog-to-digital conversion (902) of the low voltage dimmer signal at a sampling rate that is relatively high in comparison to the nominal or fundamental signal variation rate of the dimmer signal and providing sampled data; performing digital signal processing (903) on the sampled data to obtain a running data average that corresponds to the average power input from the dimmer; and operating a controller (904) to receive the running data average to produce a control signal that corresponds to the running data average. Consistent with an embodiment disclosed herein, the running data average corresponds to the average input power from the dimmer, and the control signal may be applied to regulate the drive signal to the power conversion switch of the switching mode power converter for the LED controller driver to control the average LED drive current. Accordingly, the LED drive current may correspond to the average input power from the dimmer.

Figure 10:
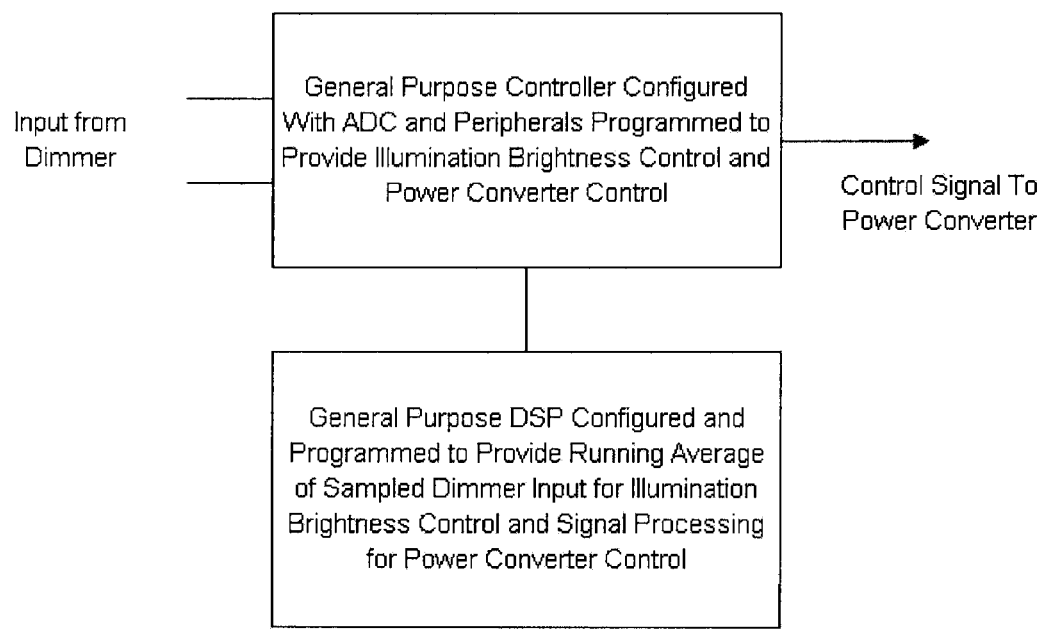
FIG. 10 is a block diagram illustrating the use of a general purpose controller and digital signal processor configured and programmed to provide the functions of various embodiments of the illumination brightness control apparatus and method disclosed herein, in accordance with an exemplary embodiment.

In an exemplary embodiment disclosed herein, general purpose programmable controller(s) and digital signal processor(s) (DSP) including instructions may be provided to process the sampled data to provide the running data average that corresponds to the average power input from the dimmer and the control signal that corresponds to the average power input from the dimmer. The programmable controller may receive the running data average for producing the control signal corresponding to the running data average. In certain embodiments, the running data average may correspond to the average input power from the dimmer. For example, the programmable controller may contain an embedded ADC for sampling the dimmer input, and may contain embedded peripheral functions, such as general purpose I/O's (GPIO), for providing the conditioning of dimmer input, loading of the dimmer, and generating the control signal. The controller may also be programmed to include functions that are consistent with various other embodiments of the illumination brightness control apparatus disclosed herein. The controller may also be programmed to include other controlling functions of the power converter, such as for active power factor correction and for EMI reduction. The use of general purpose programmable controller(s) and digital signal processor(s) over custom controller and custom digital data processing circuits may be preferred when centralized resources are available in an overall application system, such as in a centralized LED lighting control system in an intelligent home or office environment. Also, the control signal may be applied to regulate the switch driving signal to the power conversion switch of the switching mode power converter to control the average LED drive current. The LED drive current may correspond to the average input power from the dimmer. In a centralized LED lighting control system, the overall system may accept signals from a plurality of dimmers and provide control signals to a plurality of power converters to control the average driving currents in a plurality of LED circuits. For example and without limitation, FIG. 10 is a block diagram illustrating the use of a general purpose controller and a digital signal processor configured and programmed to provide the functions of various embodiments of the illumination brightness control apparatus disclosed herein.

Another solid state light emitting device similar to the LED is the organic light emitting diode (OLED). Although the material composition of the OLED is different from that of the LED, its functional characteristics are sufficiently similar so that embodiments disclosed herein are also generally applicable for an OLED lighting appliance.

Other embodiments of the invention will be apparent to those skilled in the art from consideration of the specification. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. An illumination brightness control apparatus for receiving an input voltage from a light dimmer to produce a control signal to regulate a drive signal to a power conversion switch of a switching mode power converter, the illumination control apparatus comprising:
    a voltage conditioning circuit to condition the dimmer input voltage to provide a conditioned voltage signal;
    an ADC circuit, coupled to receive the conditioned voltage, to sample analog data of the conditioned voltage signal at a sampling rate that is high relative to a nominal variation rate of the dimmer input voltage and to provide digital data corresponding to the sampled analog data;
    a digital signal processing circuit, coupled to receive the digital data provided by the ADC circuit, to produce a running data average of the digital data; and
    a controller, coupled to receive the running data average, to produce a signal corresponding to the running data average as the control signal to regulate the drive signal.

2. The apparatus of claim 1, wherein the dimmer input voltage is an alternating current voltage, the voltage conditioning circuit including a rectifier circuit to rectify the alternating current voltage.

3. The apparatus of claim 1, wherein the running data average of the digital data is computed over a duration that is long relative to the nominal variation rate of the dimmer input voltage.

4. The apparatus of claim 1, wherein the light dimmer is an SCR type dimmer.

5. The apparatus of claim 1, formed at least in part of an integrated circuit including at least one of the voltage divider circuit, the ADC circuit, the digital signal processing circuit, and the controller circuit.

6. The apparatus of claim 1, wherein the signal produced by the controller is in a form of at least one of digital data, analog data, a modulation signal, and a gating signal.

7. The apparatus of claim 1, wherein
    the control signal from the controller is updated when at least one of the following conditions is met for the running data average: a minimum change in value, a maximum change in value, falling within a range of values, exceeding a minimum running period, exceeding a maximum running period, following a periodic period, obtaining an indication of a stable value, and obtaining an indication of an unstable value; and
    the control signal is updated by controlling one or more switch driving signal parameters, including switch frequency, switch signal high duration, switch driving signal amplitude, switch driving signal phase relationship with certain operating signals in the power converter, and switch driving signal gating duration.

8. The apparatus of claim 1, further including programmable parameters for allowing programmable control of the digital signal processing and the controller circuits, the programmable parameters including at least one of programmable sampling rate of the ADC, a programmable period of the running data average period, a programmable correlation between the running data average and the average input power from the dimmer, a programmable correspondence between a functional value of the control signal and the running data average, and a programmable updating criteria of the control signal.

9. The apparatus of claim 1, wherein the apparatus regulates the drive signal for a light emitting diode (LED) controller driver to control LED drive current, and parts of the apparatus are included in an AC/DC LED lighting controller driver circuit.

10. The apparatus of claim 1, wherein the voltage conditioning circuit includes a voltage divider circuit.

11. A lighting appliance, comprising:
    an illumination brightness control apparatus for receiving an input voltage from a light dimmer to produce a control signal to regulate a drive signal to a power conversion switch of a switching mode power converter, the apparatus including:
        a voltage conditioning circuit to condition the dimmer input voltage to provide a conditioned voltage signal;
        an ADC circuit, coupled to receive the conditioned voltage sample analog data of the conditioned voltage signal at a sampling rate that is high relative to a nominal variation rate of the dimmer input voltage and to provide digital data corresponding to the sampled analog data;

a digital signal processing circuit, coupled to receive the digital data provided by the ADC circuit, to produce a running data average of the digital data; and a controller, coupled to receive the running data average, to produce a signal corresponding to the running data average as the control signal to regulate the drive signal, and an LED coupled for driving by the switching mode power converter.

12. The lighting appliance of claim 11, wherein the appliance is an LED light bulb.

13. An illumination brightness control method for receiving an input voltage from a light dimmer and producing a control signal to regulate the drive signal to a power conversion switch of a switching mode power converter, the illumination control method comprising:

conditioning the input voltage of the dimmer to provide a conditioned voltage signal;

performing analog-to-digital conversion of the conditioned voltage signal at a sampling rate that is high relative to a nominal variation rate of the dimmer input voltage to provide digital data corresponding to the sampled analog data;

producing a running data average from the digital data; and producing a control signal corresponding to the running data average as the control signal to regulate the drive signal.

14. The method of claim 13, wherein the running data average of the digital data is computed over a duration long relative to the nominal variation rate of the dimmer input voltage.

15. The method of claim 13, wherein the light dimmer is an SCR type dimmer.

16. The method of claim 13, wherein producing the control signal includes producing the signal as at least one of digital data, analog data, a modulation signal, and a gating signal.

17. The method of claim 13, further including updating the control signal when at least one of the following conditions is met for the running data average: a minimum change in value, a maximum change in value, falling within a range of values, exceeding a minimum running period, exceeding a maximum running period, following a periodic period, obtaining an indication of a stable value, and obtaining an indication of an unstable value; and adjusting the control signal in response to the condition being met by controlling one or more switch driving signal parameters, including switch frequency, switch signal high duration, switch driving signal amplitude, switch driving signal phase relationship with certain operating signals in the power converter, and switch driving signal gating duration.

18. The method of claim 13, wherein the method is implemented by instructions to a programmable digital signal processor, and wherein a plurality of dimmer signals may be received and a plurality of control signals to one or a plurality of power converters may be produced to control a plurality of light emitting diode (LED) circuits.

19. The method of claim 13, wherein the method is implemented by instructions to a programmable controller, and wherein a plurality of dimmer signals may be received and a plurality of control signals to a plurality of power converters may be produced to control a plurality of light emitting diode (LED) circuits.

20. The method of claim 13, wherein the control signal is used to regulate the drive signal to a power conversion switch for an LED controller driver to control LED drive current.

21. The apparatus and the method of claim 1, 11, or 13, wherein the apparatus and method are applied to a solid state light emitting device of similar functional characteristics as an LED.

22. The apparatus and the method of claim 1, 11, or 13, wherein the apparatus and method are applied to an organic light emitting device (OLED).

* * * * *